(12) United States Patent
McDaniel et al.

(10) Patent No.: US 6,196,328 B1
(45) Date of Patent: Mar. 6, 2001

(54) POSITION SENSOR DRIVE ARRANGEMENT

(75) Inventors: Michael S. McDaniel, Peoria; Vern I. Woodruff, DeKalb, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/589,295

(22) Filed: Jun. 7, 2000

(51) Int. Cl.⁷ .................................................. A01B 63/10
(52) U.S. Cl. ................................. 172/7; 172/311
(58) Field of Search .................. 701/50; 172/7, 172/2, 311, 677, 679, 680, 8, 10

(56) References Cited

U.S. PATENT DOCUMENTS

| | | | |
|---|---|---|---|
| 3,628,610 | 12/1971 | Morkoski | 172/7 X |
| 3,653,446 | 4/1972 | Kalmon | 172/4 |
| 3,825,072 | 7/1974 | Collins | 172/7 |
| 3,901,323 | 8/1975 | Mueller, Jr. | 172/7 |
| 3,994,348 | 11/1976 | Schowalter | 172/9 |
| 4,343,365 | 8/1982 | Rajogopal et al. | 172/7 X |
| 4,397,359 | 8/1983 | Price et al. | 172/7 X |
| 4,463,658 | 8/1984 | Heiser et al. | 172/7 X |
| 4,903,779 | 2/1990 | Takemura | 172/7 X |
| 5,178,220 | 1/1993 | Cevolini et al. | 172/7 X |
| 5,291,407 | 3/1994 | Young et al. | 172/7 X |
| 5,320,186 | 6/1994 | Strosser et al. | 172/7 X |
| 5,452,766 | 9/1995 | Imamura et al. | 172/7 |
| 5,682,954 | 11/1997 | Burns | 172/7 |
| 5,899,279 | 5/1999 | Bennett et al. | 172/7 |

Primary Examiner—Christopher J. Novosad
(74) Attorney, Agent, or Firm—Jeffrey A. Greene

(57) ABSTRACT

A drive arrangement (62) for transferring rotational motion from a pin (44) of a draft arm (14,16) of a hitch assembly (10) to a position sensor (64). The drive arrangement (62) includes a driver (68) that acts as a wear compensation mechanism (66).

15 Claims, 2 Drawing Sheets

POSITION SENSOR DRIVE ARRANGEMENT

TECHNICAL FIELD

The invention relates to a position sensor for sensing the position of a shaft, in particular the rotational position of a pin shaft for a draft arm of a hitch assembly.

BACKGROUND ART

Work machines such as agricultural tractors are commonly used to tow implements behind them for various purposes, including planting and tilling. Hitches are commonly incorporated on the back of a tractor to provide the point of attachment for coupling the implement to the tractor. Such hitches have been designed to provide movement of the implement relative to the tractor through hydraulic or other mechanisms operated by a control system or the tractor operator. Controlling the implement is important so that turning and other desired operations can be readily accomplished.

Accordingly, control devices are used in conjunction with electronic systems to allow the position of the implement to be monitored and automatically controlled during operation. To date, the devices and systems have been used to monitor and control position and draft. The position controls are used for raising and lowering of the implement coupled to the hitch, while draft controls adjust the position of the implement to optimize the force that the implement exerts on the machine during operation. These systems utilize devices that monitor one or more components of the hitch such as draft arms, lift arms, or the pitch link for generating a signal indicative of position or force. The devices require a linkage to couple various sensors between the machine and the hitch or position sensors located directly in a connector or pin. One such device is disclosed in U.S. Pat. No. 5,682,954 issued Nov. 4, 1997 and assigned to the Case Corporation Racine, Wis. This arrangement uses a strain gage positioned in the upper pivot pin of the pitch link and sends signals to a control system representative of the force exerted on the work machine by the implement under tow. However, none of the previous arrangements or control systems have been used to accurately monitor the side to side or pivotal position of the draft arms to aid in hitch assisted steering.

The present invention is directed to overcoming one or more of the problems as set forth above.

DISCLOSURE OF THE INVENTION

In one aspect of the current invention a drive arrangement for a position sensor includes a member and a pivotal member. A pin pivotally connects the pivotal member to the member. In addition a position sensor is fixedly connected to the member and a wear compensating mechanism operatively connects the position sensor to the pin.

BEST MODE FOR CARRYING OUT THE INVENTION

Figure 1:
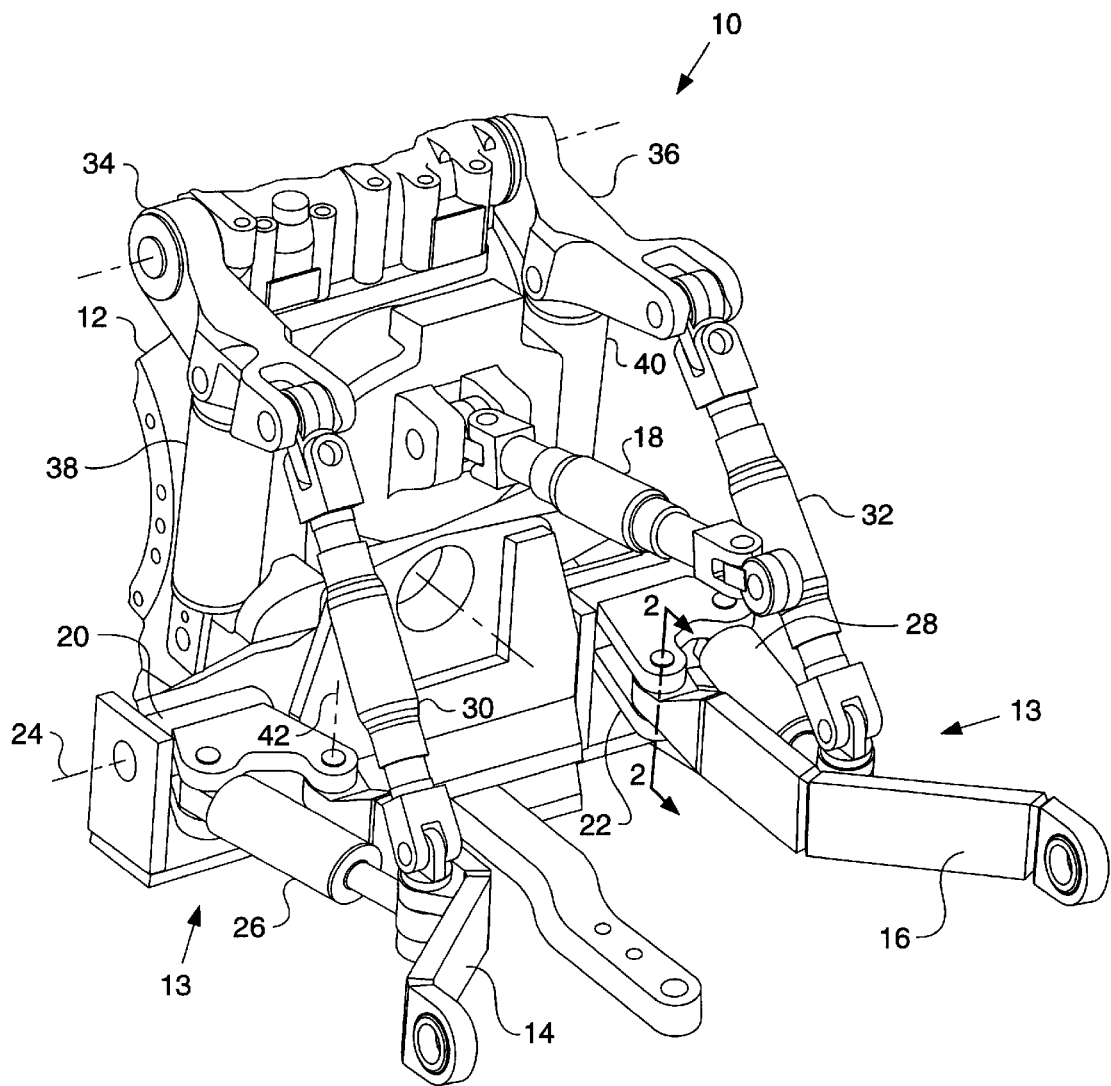
FIG. 1 shows a diagrammatic perspective view of a hitch assembly embodying the present invention.

An example of a hitch assembly 10 for coupling an implement (not shown) to a work machine 12 is shown in FIG. 1. Hitch 10 is a three point hitch having a pair of draft arm assemblies 13 that includes pivotal members or draft arms 14,16. Hitch 10 also includes an upper or pitch link 18. Pitch link 18 is elevationally spaced from and centered above the draft arms 14,16 and connected to the work machine 12 in a conventional manner. The draft arms 14,16 are pivotally connected to intermediate members or connectors 20,22. Connectors 20,22 are pivotally connected about a horizontal axis 24 to the work machine 12.

Variable length members 26,28 are positioned between and pivotally connected to the draft arms 14,16 and connectors 20,22. It should be understood in this example that variable length members 26,28 are fluid cylinders but other suitable variable length members can be used such as ball and screw actuators. The variable length members 26,28 can be operated in a free/floating mode or can be used to apply a positive force against the draft arms 14,16 to aid in steering.

Links 30,32 connect the draft arms 14,16 to lift arms 34,36. Actuators 38,40 are connected to the work machine 12 and the lift arms 34,36 and used in a known manner for raising and lowering the implement.

Figure 2:
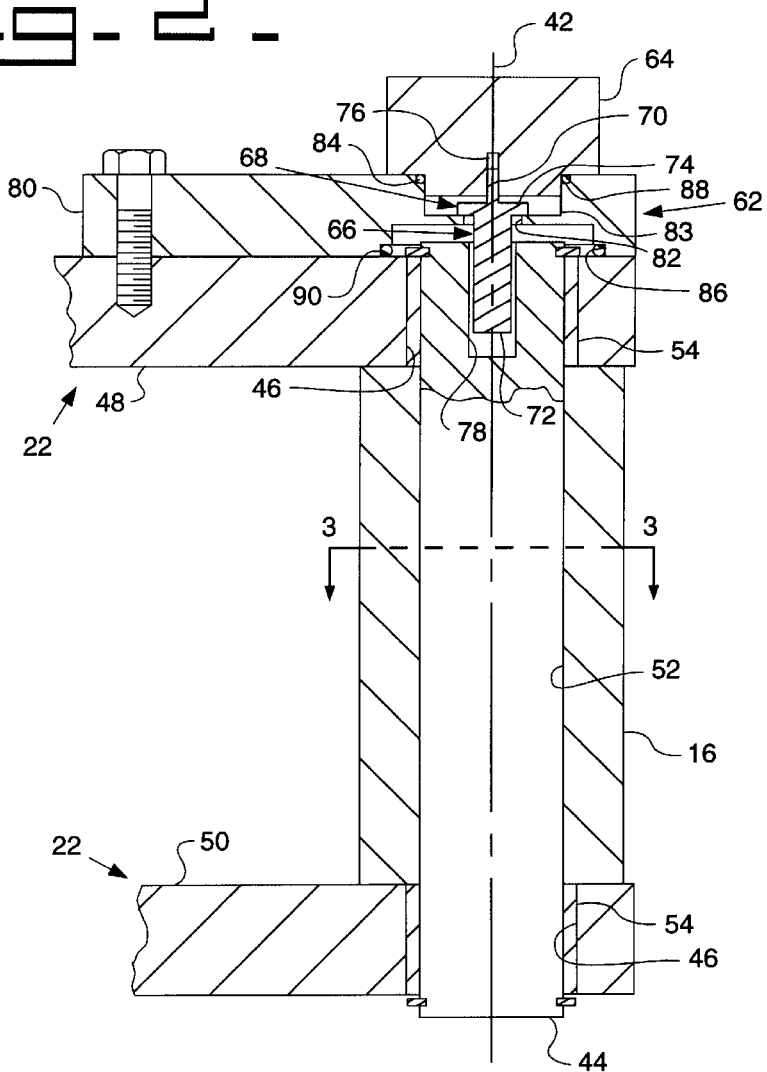
FIG. 2 is a enlarged diagrammatic section view of the position sensor drive arrangement taken along line 2—2 of FIG. 1.

Since draft arms 14,16 and connectors 20,22 are substantially mirror images of each other, only the connection of one draft arm 16 to connector 22 will be further discussed in detail. Referring to FIG. 2, draft arm 16 pivots about a vertical axis 42 via a pin 44. Specifically pin 44 is inserted through bores 46 positioned in an upper portion 48 and a lower portion 50 of connector 22 and a bore 52 of the draft arm 16. Bushings 54 are positioned in the bores 46 and retained there as by press fit and provide bearing surfaces for pin 44.

Figure 3:
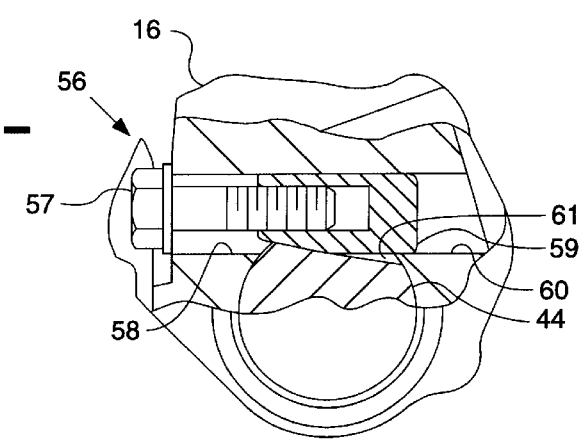
FIG. 3 is an enlarged diagrammatic sectional view of the position sensor drive arrangement components taken along line 3—3 of FIG. 2.

As seen in FIG. 3, the pin 44 is fixedly secured to the draft arm 16 by a wedge locking mechanism 56. Specifically, wedge locking mechanism 56 includes a fastener 57 that is inserted through a bore 58 in the draft arm 16. A wedge pin 59 is inserted through a bore 60 and aligns with a notch 61 in pin 44. Tightening the fastener 57 pulls the wedge pin 59 into locking engagement with the draft arm 16 and the pin 44.

Referring back to FIG. 2, a drive arrangement 62 is positioned between and provides driving engagement with the pin 44 and a position sensor 64 (not shown in FIG. 1 for clarity). The drive arrangement 62 also acts as a wear compensating mechanism 66 and includes a driver 68. The driver 68 has a first portion 70, a second portion 72 and a shoulder portion 74. The first and second portions 70,72 each extend a predetermined distance in opposite directions along axis 42 outwardly away from the shoulder portion 74 each defining a plane along the axis. The plane defined by the first portion 70 extends in and out of the page and the plane defined by the second portion 72 runs from left to right both as seen in FIG. 2. Thus, the first and second portions 70,72 are positioned normal to one another. The first portion 70 has a predetermined thickness and width and resembles a straight screw driver blade that operatively engages a rectangular slot 76 in the working portion of the position sensor 64. The second portion 72 has a predetermined thickness and width, generally larger than the first portion 70 and operatively engages a rectangular slot 78 in the pin 44.

The position sensor 64 is removably secured to a mounting plate 80 that is in turn removably secured to the connector 22 by fasteners. Mounting plate 80 has an aperture 82 coaxial with axis 42 and elevates the position sensor 64 a predetermined distance above the connector 22. Positioned in the aperture 82 is a surface 83 that the shoulder portion 74 of the driver 66 rides on. The driver 68 also floats in the aperture 82 between the pin 44 and the position sensor 64. A counter bore 84,86 is positioned in the upper and lower portion of the aperture 82. O-ring 88,90 are positioned in the counter bores 84,86. The O-rings 88,90 seal the aperture from moisture and debris during normal operation.

INDUSTRIAL APPLICABILITY

In operation, as an implement is being towed behind the work machine 12 the position sensor 64 generates control signals indicative of the position of the draft arms 14,16 and sends the signal to a machine control system. Specifically, as the draft arms 14,16 pivot from side to side about vertical axis 42 the pin 44 rotates position sensor 64 through the operative engagement of the driver 68.

The driver 68 not only operatively connects the position sensor 64 to the pin 44 but also acts as the wear compensating mechanism 66. For example, the pin 44 and the bushings 54 will wear during normal operation. The wear will result in the pin 44 tilting either fore and aft or from side to side and pivot askew from the vertical axis 42. With the first portion 70 and the second portion 72 of the driver 68 positioned normal to one another, the pin 44 is free to tilt in the direction of the first portion 70, the second portion 72 or a combination of the two while still providing accurate driving engagement with the position sensor 64.

Thus a drive arrangement 62 is provided for a position sensor 64 that is low profiled so as not to interfere with the work machine 12 in a fully raised position, seals the position sensor from moisture and debris, and uses as few components as possible minimizing tolerance stack up thereby increasing repeatability and accuracy.

Other aspects, objects, and features of the present invention can be obtained from a study of the drawings, the disclosure, and the appended claims.

What is claimed is:

1. A drive arrangement (62) for a position sensor (64) comprising;
   a member (20,22);
   a pivotal member (14,16);
   a pin (44) pivotally connecting said pivotal member (14,16) to said member (20,22);
   a position sensor (64) being fixedly connected to said member (20,22); and
   a wear compensating mechanism (66) operatively connecting said position sensor and said pin (44).

2. The drive arrangement of claim 1 wherein said wear compensating mechanism (66) includes a driver (68) having a first portion (70), a second portion (72) and a shoulder portion (74), said first portion (70) and said second portion (72) extending in opposite axial directions outward away from said shoulder portion (74), and said first portion (70) is positioned to engage said position sensor (64) and said second portion (72) is positioned to engage said pin (44).

3. The drive arrangement of claim 2 wherein said first portion (70) is positioned normal to said second portion (72).

4. A drive arrangement (62) for a position sensor (64) on a hitch assembly (10) comprising:

an intermediate connector (20,22);
a draft arm (14,16);
a pin (44) pivotally connecting said draft arm (14,16) to said intermediate connector (20,22) about a vertical axis (42); and
a position sensor (64) being fixedly connected to said intermediate connector (20,22) and operatively connected with said pin (44).

5. The arrangement (62) of claim 4 further including a wear compensating mechanism (66).

6. The arrangement (62) of claim 5 wherein said wear compensating mechanism (66) includes a driver (68) having a first portion (70) positioned to engage said position sensor (64) and a second portion (72) positioned to engage said pin (44).

7. The arrangement (62) of claim 6 wherein said first portion (70) is positioned normal to said second portion (72).

8. The arrangement (62) of claim 4 wherein said intermediate connector (20,22) is pivotally connected to a work machine (12) about a horizontal axis (24) and provides pivotal connection of said draft arm (14,16) about a vertical axis (42).

9. The arrangement (62) of claim 4 wherein said draft arm (14,16) is fixedly attached to said pin (44) by a wedge locking mechanism (56).

10. A hitch assembly (10) for attaching an implement to a work machine (12) comprising:
    a pair of draft arm assemblies each including;
       a draft arm (14,16);
       an intermediate connector (20,22) pivotally connected to the work machine (12) about a horizontal axis (24) and providing a connection for said draft arm (14,16) about a vertical axis (42);
       a pin (44) pivotally connecting said draft arm (14,16) to said intermediate connector (20,22); and
    at least one position sensor (64) being fixedly connected to one of said draft arm assemblies (13) and operatively connected to said pin (44) along a vertical axis (42).

11. The hitch assembly (10) of claim 10 further including a wear compensating mechanism (66).

12. The hitch assembly (10) of claim 11 wherein said wear compensating mechanism (66) includes a driver (68) having a first portion (70), a second portion (72) and a shoulder portion (74), said first portion (70) and said second portion (72) extending in opposite axial directions outward away from said shoulder portion (74), and said first portion (70) is positioned to engage said position sensor (64) and said second portion (72) is positioned to engage said pin (44).

13. The hitch assembly (10) of claim 12 wherein said first portion (70) is positioned normal to said second portion (72).

14. The hitch assembly (10) of claim 10 wherein said draft arm (14,16) is fixedly attached to said pin (44) by a wedge locking mechanism (56).

15. The hitch assembly (10) of claim 10 further including a pitch link (18).

* * * * *